United States Patent [19]
de Haas et al.

[11] Patent Number: 5,475,083
[45] Date of Patent: Dec. 12, 1995

[54] COMPOSITION OF AN ETHYLENE/CARBON MONOXIDE COPOLYMER

[75] Inventors: Jacob L. de Haas, Meerssem; Valerie M. C. Reid, Maastricht, both of Netherlands

[73] Assignee: DSM N.V., Netherlands

[21] Appl. No.: 226,412

[22] Filed: Apr. 12, 1994

Related U.S. Application Data

[63] Continuation of Ser. No. 917,032, filed as PCT/NL91/00248, Dec. 4, 1991, abandoned.

[30] Foreign Application Priority Data

Dec. 5, 1990 [NL] Netherlands ............................ 9002666

[51] Int. Cl.$^6$ ........................................ C08F 6/00
[52] U.S. Cl. ......................... 528/491; 528/492; 528/495; 528/220; 528/392
[58] Field of Search ..................... 528/491, 492, 528/495; 524/98, 99, 104, 105, 186, 189, 240, 287, 297, 375, 284, 470

[56] References Cited

U.S. PATENT DOCUMENTS

| | | | |
|---|---|---|---|
| 3,997,489 | 12/1976 | Coker | 524/312 |
| 4,293,473 | 3/1980 | Eastman | 524/98 |
| 4,795,774 | 1/1989 | Kluttz | 524/246 |
| 4,885,318 | 12/1989 | Danforth | 524/281 |
| 4,929,711 | 5/1990 | Chang et al. | 528/392 |
| 4,992,499 | 2/1991 | Syrier et al. | 524/194 |
| 4,994,513 | 2/1991 | Syrier et al. | 524/210 |
| 5,028,576 | 7/1991 | Drent et al. | 528/392 |
| 5,045,258 | 9/1991 | van Breen et el. | 264/85 |
| 5,063,008 | 11/1991 | Coleman-Kammula et al. | 427/352 |
| 5,063,088 | 11/1991 | Coleman-Kammula et al. | 427/352 |
| 5,194,210 | 3/1993 | Lommerts et al. | 264/184 |

FOREIGN PATENT DOCUMENTS

| | | |
|---|---|---|
| 0326223 | 8/1989 | European Pat. Off. . |
| 0326224 | 8/1989 | European Pat. Off. . |
| 0360358 | 3/1990 | European Pat. Off. . |
| 2292007 | 6/1976 | France . |

*Primary Examiner*—Tae H. Yoon

[57] ABSTRACT

Compositions of an ethylene/carbon monoxide copolymer and a second component serving as swelling agent or gelling or non-gelling solvent, which are suited to be moulded below the melting point of the copolymer using the customary moulding techniques, and the second component of which is chosen from a group so far not known as possible components of compositions of ethylene/carbon monoxide copolymers.

9 Claims, No Drawings

COMPOSITION OF AN ETHYLENE/CARBON MONOXIDE COPOLYMER

This is a continuation of application Ser. No. 07/917,032, filed on filed as PCT/NL91/00248, Dec. 4, 1991, which was abandoned upon the filing hereof.

The invention relates to a composition comprising an ethylene/carbon monoxide copolymer, as the first component, and a second component.

Such a composition in the form of a solution, wherein the second component is a solvent for the copolymer, is known from EP-A-360.358. In it, a description is given of how this solution is spun to form a fibre, which is subsequently subjected to a treatment for removing the solvent and finally drawn in a solvent-free state, yielding a fibre with a high strength and modulus. The solvents for the copolymer mentioned in said application are m-cresol, hexafluoroisopropanol and mixtures thereof. The disadvantage of these solvents is that they are highly toxic, which is manifested also by their low MAC values, which for m-cresol, for instance, is 5 ppm. Additionally, for hexafluoroisopropanol the extra disadvantages are the very high price and the limited availability of this substance, which seriously hinder its use as a solvent for ethylene/carbon monoxide copolymer on a commercial scale and make such use highly unattractive economically. Further, the only solvents known in the art for ethylene/carbon monoxide copolymers have so far been 2-chlorophenol and 3-chlorophenol.

As ethylene/carbon monoxide copolymer, hereinafter referred to as CO-copolymer, generally shows thermal degradation already at temperatures around its melting point, the production of articles from a CO-copolymer melt is possible only on a limited scale. The production of articles from CO-copolymer from suitable compositions, for instance from solutions of the polymer, can be effected, on the other hand, at temperatures well below the melting point of the polymer and consequently without any danger of thermal degradation. The availability of well-processable compositions of a CO-copolymer will substantially widen the processing and application potential of CO-copolymers.

It has now been found that compositions whose second component is chosen from the group consisting of benzaldehyde, nitrobenzene, benzyl alcohol, anisole, cyclohexanone, cyclohexanol, γ-butyrolactone, dimethyl phthalate, N,N-dimethylacetamide, phenylhydrazine, o-dichlorobenzene, caprolactam, phenol, pyridine, benzoic acid, formic acid, N-methylpyrrolidinone, aniline, phenoxyethanol, N-methylimidazole and a mixture of two or more of these substances can be well processed below the melting point of CO-copolymer.

By CO-copolymer is meant an alternating copolymer built up from alternately a unit originating from an olefinically unsaturated monomeric unit and a carbon monoxide unit. So the share of each of the components is 50 moles %. This is also the maximum possible share of the CO units in such a copolymer. Within the scope of the invention, an alternating copolymer is spoken of also when at least 48 moles % of the copolymer consists of CO units. The olefinically unsaturated monomer used may, for instance, be ethylene or mixtures of ethylene and other alkenes, preferably propylene or octene, or mixtures of ethylene and another olefinically unsaturated monomer. CO-copolymers in which only ethylene is used as olefinically unsaturated monomer have a higher melting point, up to 257° C. at most, than those in which other unsaturated monomers or mixtures are present, and these are therefore preferred when the use of a product made from the CO-copolymer requires a high temperature resistance. Processes for the production of CO-copolymers of this grade are known per se from, for instance, EP-A-121.965 and EP-A-239.145.

A suitable, well processable composition in any case complies with the requirement that it can be converted below the melting point of the CO-copolymer to form CO-copolymer-containing articles of the desired shape using the known moulding techniques. To this end it is generally necessary that the second component should be suited to form, with CO-copolymer, a readily mouldable and preferably homogeneous and essentially single-phase composition. Such a composition may have the nature of a copolymer swollen in the second component and formed, for instance, by intimately mixing originally dry copolymer powder with the second component, at elevated temperature if so required. This will change the dry powder, which is difficult to mould below its melting point, into a mouldable mass of swollen powder particles that can be given the desired form also below the melting point of the polymer and in which the presence of the second component ensures a good coherence of the swollen powder particles, which is retained also after removal of the second component. Such techniques are known per se, for instance from EP-A-292.074. For a proper processability, if the composition has the form of a swollen copolymer, at least 20% (wt) of it must consist of the second component and preferably at least 50% (wt) of it consists of the second component. A composition in the form of a swollen polymer can be moulded by means of solids moulding techniques, such as paste and ram extrusion and cold and hot moulding techniques. A second component showing sufficient affinity with CO-copolymer to make it swell, as described above, but with which the CO-copolymer cannot form a homogeneous solution under atmospheric pressure and at temperatures between the melting point of the second component and the lower of 1. the melting point of the CO-copolymer and 2. the boiling point of the second component will hereinafter be referred to as swelling agent. A second component which CO-copolymer does form a homogeneous solution with under the above conditions will hereinafter be referred to as solvent. Generally, a mixture of two or more swelling agents is a swelling agent, too, in the same way as a mixture of two solvents, too, is as a rule a solvent. The behaviour of a mixture of a solvent and a swelling agent strongly depends on the chosen combination and the proportion of the two substances in the mixture. Only in a limited range of proportion is such a mixture found to be a solvent, mostly such a mixture behaves like a swelling agent.

CO-copolymer compositions in the form of a swollen copolymer are highly suited for making moulded parts and bigger articles, but are less suited for the production of articles with very small dimensions in at least one direction, such as fibres and tapes or films. CO-copolymer, however, is highly suited for use in heat-resistant fibres and films, and such articles are preferably produced by means of spinning and extrusion techniques. The spinning and extrusion of CO-copolymers is preferably done from solutions, in connection with the said thermal degradation of the polymer above its melting point. That is why the second component is preferably chosen from the group consisting of phenol, pyridine, benzoic acid, formic acid, N-methylpyrrolidinone, aniline, phenoxyethanol, N-methylimidazole and a mixture of two or more of these substances, a mixture of 40–50% (wt) phenol and 60–55% (wt) benzaldehyde and a mixture of 25–35% (wt) caprolactam and 75–65% (wt) phenol. The common characteristic of these is that they are solvents for the CO-copolymer.

The concentration of the CO-copolymer in these solutions may vary within wide limits. It has been found that from compositions with CO-copolymer concentrations lower than 0.5% (wt) only solvent-free articles can be produced that cannot be further processed owing to their insufficient coherence. The CO-copolymer concentration in the composition according to the invention is therefore preferably at least 0.5% (wt). From an economic point of view compositions with low CO-copolymer concentrations, for instance lower than 2% (wt), are less attractive owing to the relatively large amount of solvent that must be removed and be further processed in the production of articles consisting of CO-copolymer while using the composition. Preference is given therefore to the use of solutions with a CO-copolymer concentration of at least 2% (wt) and more preference to concentrations of at least 5% (wt). Compositions in the form of a solution with a CO-copolymer concentration of up to about 50% (wt) can still be well processed with techniques for the processing of solutions, such as spinning, casting or extruding. As the copolymer concentration increases the character of the composition changes gradually from that of a solution into that of a swollen polymer, even if a solvent is used as second component. However, the person skilled in the art will be capable of choosing the most suitable moulding technique for each composition according to the invention.

CO-copolymer solutions can be used, inter alia, in spinning, extruding, casting or other forms of moulding the composition, followed by the removal of the solvent, often in combination with further downstream processes, such as compression or stretching. In this way, according to the process of EP-A-360.358, fibres are produced from CO-copolymer having a high modulus and a high tensile strength.

Some of the said solvents are found with CO-copolymer to form a composition in the form of a solution which changes into a thermoreversible gel when cooled to below the gelling point of the solution. This behaviour of polymer solutions is known per se, for instance from Keller and Barham, Plastics and Rubber International, Vol. 6, No. 1 (1981), page 25, and the references mentioned there. The thermoreversible gelling behaviour of these solutions makes it possible for gel articles to be produced therefrom, which articles are found to be characterized by a high degree of stretchability and in which, during the stretching, a continuous build-up of the tensile strength and modulus of elasticity takes place to very high values. The production of gel articles from polymer compositions by thermoreversible gellation and the high degree of stretching that goes with it are known for a number of polymers other than CO-copolymers, for instance from GB-B-2.042.414, GB-B-2.051.667, EP-A-105.169 and EP-B-144.983. The production of gel articles is generally effected by spinning or extruding a thermoreversibly gelling solution of the polymer at a temperature above the dissolving temperature, followed by the cooling of the article, consisting of the solution, to below the gelling point, in which process, with or without complete or partial removal of the solvent, a gel article is formed with the good stretching characteristics described above. That is why the second component is preferably chosen from the group consisting of benzoic acid, formic acid, N-methylpyrrolidinone, aniline, phenoxyethanol, N-methylimidazole and a mixture of two or more of these substances, a mixture of 40–45% (wt) phenol and 60–55% (wt) benzaldehyde and a mixture of 25–35% (wt) caprolactam and 75–65% (wt) phenol, which form a gelling solution with CO-copolymer.

Special preference is given to the use of benzoic acid and formic acid as gelling solvents. These have the advantage that, unlike most of the swelling agents and solvents found, they are not toxic, or only to a very low degree, and can therefore be applied using only minimum precautions for the protection and safety of the environment and of the persons engaged in the processing.

A supplementary advantage of the use of gelling solvents over and above the known and other solvents mentioned in this application is the fact that CO-copolymer dissolves in these second components only at temperatures much higher than the melting point of the second component. With many solvents, including the known ones, CO-copolymer has been found to dissolve at virtually every temperature at which the solvent is liquid and, moreover, CO-copolymer has been found to show very great affinity with these known solvents, which manifests itself even at low concentrations in a very high viscosity of the solutions. With the known solvents, therefore, it is possible only to prepare compositions with low concentrations, and therefore solutions with a CO-copolymer concentration higher than 1–8% (wt), depending on the molecular weight of the polymer, are not known. The presence of a temperature range in which CO-copolymer does not dissolve in the said solvents makes it possible, with the customary techniques, to produce compositions of CO-copolymer and of these solvents, as second components, having concentrations higher than can be realized with the known solvents. A process known per se that can be used for the preparation of these more highly concentrated compositions according to the invention is the preparation of a suspension of the substance to be dissolved in the solvent at a temperature at which the substance does not yet dissolve in the solvent and the subsequent raising of the temperature of the suspension to above the dissolving point, in which process a solution with the corresponding concentration will then be formed. With the other solvents for CO-copolymer this technique cannot be used or only with very great difficulty, because the polymer dissolves in it immediatly upon addition to the solvent while a highly viscous composition is then being formed already at low concentrations, in which further polymer additions can no longer be homogeneously distributed and dissolved. When the molecular weight increases, this effect occurs already at low concentrations.

The composition according to the invention is used mainly in the production of articles from CO-copolymer on the basis of this composition, and the invention therefore also relates to the use of this composition in the production of CO-copolymer-containing articles.

The invention is elucidated by means of the following examples without, however, being limited thereto. The CO-copolymers used are alternating copolymers of carbon monoxide and ethylene, in which the share of each of the components is 50 moles %. These copolymers are synthesized according to the process described in EP-A-239.145. The intrinsic viscosity (IV) is determined in m-cresol at 100° C.

EXAMPLE I

For a number of substances an examination is made to find out if for CO-copolymer they are swelling agents or solvents. To this end an amount of CO-copolymer in the form of a powder, having an IV of 9.9 dl/g, is added each time at room temperature in a glass beaker to 4 ml of the substance to be examined. The amount of copolymer is so chosen that its share in the composition is 2% (wt). While being stirred continuously, the whole of it is heated in a nitrogen atmosphere until an appreciable effect occurs, but not higher than just below the boiling point of the substance. It is found that with a first group of substances there is no interaction between the copolymer and the substance. In the substances belonging to a second group, the polymer powder is found to show clearly visible swelling until in its swollen state it occupies at least 10% of the original volume of polymer and substance. In addition to the swollen polymer, non-absorbed liquid remains. After cooling without stirring, the swollen polymer separates itself from the non-absorbed liquid, so that clearly two layers are visible. The volume of the swollen polymer is still at least 10% of the total volume. In a third group of substances the copolymer is found to dissolve to form a clear, homogeneous solution, either direct, in case the substance is liquid already at room temperature, or as soon as the substance has been raised to above its melting point and has consequently become liquid. In a fourth group of substances the copolymer is found not to dissolve until the mixture of liquid material and copolymer powder is heated to above a certain temperature, the dissolving temperature. When the solution is cooled to below the gelling point, which practically coincides with the dissolving temperature, a gel article will be formed. In Table 1 the four said groups are referred to successively by the symbols '−' if there is neither swelling nor dissolution, '0' if swelling occurs, 'x' if at every temperature above room temperature and above the melting point of the substance the copolymer dissolves in it and '+' if there is a clear dissolving temperature for the mixture of copolymer and material. With mixtures the amount of each of the components is shown in percentages by weight.

TABLE 1

| Material | Interaction | Dissolving temp. °C. | Melting temp. °C. |
|---|---|---|---|
| acetone | − | | |
| toluene | − | | |
| n-butanol | − | | |
| chloroform | − | | |
| dimethylformamide | − | | |
| acetonitrile | − | | |
| benzene | − | | |
| 1,4-dioxane | − | | |
| amyl acetate | − | | |
| acetic anhydride | − | | |
| acetic acid | − | | |
| benzaldehyde | 0 | | |
| nitrobenzene | 0 | | |
| benzyl alcohol | 0 | | |
| anisole | 0 | | |
| cyclohexanone | 0 | | |
| cyclohexanol | 0 | | |
| γ-butyrolactone | 0 | | |
| dimethyl phthalate | 0 | | |
| N,N-dimethylacetamide | 0 | | |
| phenylhydrazine | 0 | | |
| o-dichlorobenzene | 0 | | |
| caprolactam | 0 | | |
| 45/55 phenol/pyridine | 0 | | |
| 50/50 γ-butyrolactone/cyclohexanone | 0 | | |
| 50/50 γ-butyrolactone/anisole | 0 | | |
| 40/60 γ-butyrolactone/anisole | 0 | | |
| 30/70 γ-butyrolactone/benzaldehyde | 0 | | |
| 45/55 cyclohexanone/benzyl alcohol | 0 | | |
| 90/10 2-chlorophenol/caprolactam | 0 | | |

TABLE 1-continued

| Material | Interaction | Dissolving temp. °C. | Melting temp. °C. |
|---|---|---|---|
| 40/60 benzaldehyde/m-cresol | 0 | | |
| phenol | x | 43 | 43 |
| pyridine | x | <20 | −42 |
| benzoic acid | + | 180 | 122 |
| formic acid | + | 80 | 8 |
| N-methylpyrrolidinone | + | 200 | −24 |
| aniline | + | 150 | −6 |
| phenoxyethanol | + | 230 | 11–13 |
| N-methylimidazole | + | 110 | −6 |
| 45/55 phenol/benzaldehyde | + | 84 | <35 |
| 30/70 caprolactam/phenol | + | 175 | <35 |

EXAMPLE II

In an Erlenmeyer flask 0.5 gramme CO-copolymer with an IV of 1.1 dl/g is heated, while being stirred, to 150° C. together with 9.5 grammes aniline in a nitrogen atmosphere to form a homogeneous viscous solution. This solution was transferred to a spinning vessel at 150° C. and pressed through a spinning aperture of 0.5 mm. The fibre thus formed is quenched in water of 25° C., in which the fibre gells. After extraction of the aniline, the fibre is subjected to after-stretching at 200° C., and wound up.

EXAMPLE III

To a mixture of 45 grammes phenol and 55 grammes benzaldehyde, 4 grammes CO-copolymer with an IV of 9.9 dl/g is added. The mixture is heated, while being stirred, to 90° C. in a nitrogen atmosphere. At 84° C. the polymer dissolves. The solution is homogenized by leaving it to stand for 10 minutes at 90° C. during continuous stirring. The solution is then poured into a glass dish and cooled to room temperature, so that a firm gel is formed. The solvent is removed by evaporation, leaving a self-supporting film.

EXAMPLE IV 10 grammes CO-copolymer with an IV of 9.9 dl/g is mixed in an Erlenmeyer flask with 90 grammes phenol. While being continuously stirred, the mixture is heated to 50° C. in a nitrogen atmosphere. This results in the formation of a homogeneous viscous solution. When cooled to room temperature, the solution solidifies by crystallization of the solvent. By removing the phenol by sublimation, a very porous structure is obtained.

EXAMPLE V 5 grammes CO-copolymer with an IV of 9.9 dl/g is mixed with 95 grammes cyclohexanone. While being stirred, the mixture is heated to 150° C. in a nitrogen atmosphere. This results in the formation of a strongly swollen polymer. The mixture is cooled to room temperature and the swollen polymer is removed from the solvent by filtration. The polymer swollen with cyclohexanone is compressed in a mould at 25 bar and 150° C. to form a coherent film. The solvent is removed by evaporation, leaving a self-supporting film.

EXAMPLE VI 2.5 grammes CO-copolymer with an IV of 9.9 dl/g is mixed in liquid nitrogen with 2.5 grammes benzoic acid to form a homogeneous dispersion. After evaporation of the liquid nitrogen, a powdery homogeneous mixture remains. This mixture is heated in a steel vessel in a nitrogen atmosphere to 210° C., during which process the mixture changes into a homogeneous solution. The solution is pressed through a round opening with a diameter of 1 mm. In the process a homogeneous gel fibre is obtained suited for further treatment.

EXAMPLE VII 2.5 grammes CO-ethylene copolymer with an IV of 9.9 dl/g is mixed at room temperature with 50 grammes benzoic acid in an Erlenmeyer flask. The mixture is heated to 200° C. in a nitrogen atmosphere while being continuously stirred. At 180° C. the polymer dissolves in the melted benzoic acid. After 15 minutes the solution is poured out onto a roll with a temperature of 130° C., resulting in an even film with a thickness of 0.3 mm. After cooling to room temperature, the film is subjected to an extraction treatment using acetone, so that a porous film is obtained.

EXAMPLE VIII

Example VII is repeated except that the benzoic acid is removed by sublimation at room temperature under vacuum, leaving a very porous flexible film.

EXAMPLE IX

Under the conditions of Example VII a solution is prepared of 25 grammes CO-ethylene copolymer with an IV of 9.9 dl/1 in 300 grammes benzoic acid. After homogenizing the solution for 10 minutes by stirring at 200° C., the solution is transferred to a steel spinning vessel with plunger and spinning aperture. The solution is spun out through an aperture with a diameter of 0.25 mm into an acetone bath at room temperature, in which process a white fibre is formed. The distance between the Spinning aperture and the surface of the liquid of the acetone bath is 20 mm. After extraction of the benzoic acid, the fibre is stretched 8× at 220° C. The stretched fibre has a tensile strength of 0.8 GPa and a Young's modulus of 18 GPa.

EXAMPLE X 4 grammes CO-ethylene copolymer with an IV of 9.9 dl/g is dissolved in 96 grammes formic acid during continuous stirring and in a nitrogen atmosphere. At about 80° C. the copolymer dissolves. The stirring is discontinued and the solution is kept at 95° C. for 15 minutes in order to allow it to homogenize. The solution is spun through a round spinning aperture with a diameter of 0.5 mm to form a fibre. The spun fibre is passed into a water bath of 20° C., so that a gel fibre that can be handled is formed. The formic acid still present in the fibre is extracted for 2 hours using water. After extraction, the film is dried for 48 hours in a nitrogen atmosphere at 60° C. After drying, the fibre is stretched 9 times at 220° C. The stretched fibre has a tensile strength of 1.3GPa and a modulus of 33 GPa.

EXAMPLE XI

While being continuously stirred, 10 grammes CO-copolymer with an IV of 1.1 dl/g is dissolved in 40 grammes formic acid in a nitrogen atmosphere. The solution is homogenized by allowing it to rest for 30 minutes at 98° C. The viscous solution is then moulded to form a film between two rolls heated to 90° C. The width of the aperture between the rolls is 0.1 mm. The film is cooled to room temperature, extracted for two hours using water and then dried for 48 hours in a nitrogen atmosphere at 70° C. The film obtained has a porosity of 45%.

We claim:

1. A composition comprising an ethylene/carbon monoxide copolymer, and a solvent, wherein said copolymer is present in an amount of at least 0.5% by weight of said composition, wherein solvent is present in an effective solvent concentration of at least 20% by weight of said composition, and wherein said solvent is selected from the group consisting of (i) benzaldehyde, benzyl alcohol, anisole, cyclohexanone, cyclohexanol, γ-butyrolactone, N,N-dimethylacetamide, phenylhydrazine, caprolactam, pyridine, N-methylpyrrolidinone, phenoxyethanol, N-methylimidazole, or a mixture of two or more of these substances, and (ii) a mixture of 40–45% (wt) phenol and 60–55% (wt) benzaldehyde, or a mixture of 25–35% (wt) caprolactam and 75–65% (wt) phenol.

2. A composition according to claim 1, wherein said solvent is selected from the group consisting of (i) pyridine, N-methylpyrrolidinone, phenoxyethanol, or N-methylimidazole, and (ii) a mixture of 40–45% (wt) phenol and 60–55% (wt) benzaldehyde, or a mixture of 25–35% (wt) caprolactam and 75–65% (wt) phenol.

3. A composition according to claim 2, wherein said solvent is selected from the group consisting of (i) N-methylpyrrolidinone, phenoxyethanol, or N-methylimidazole, and (ii) a mixture of 40–45% (wt) phenol and 60–55% (wt) benzaldehyde, or a mixture of 25–35% (wt) caprolactam and 75–65% (wt) phenol.

4. A composition according to claim 1, wherein said composition consists essentially of said ethylene/carbon monoxide copolymer and said solvent.

5. A thermally soluble copolymer composition comprising an ethylene/carbon monoxide copolymer, wherein said copolymer is present in a amount of from about 0.5% by weight of said composition, and a solvent, wherein said solvent is present in an effective solvent concentration of at least 20% by weight of said composition and said solvent is selected from the group consisting of (i) benzaldehyde, benzyl alcohol, anisole, cyclohexanone, cyclohexanol, γ-butyrolactone, N, N-dimethylacetamide, phenylhydrazine, caprolactam, pyridine, N-methylpyrrolidinone, phenoxyethanol, N-methylimidazole, or a mixture of two or more of these substances, and (ii) a mixture of 40–45% (wt) phenol and 60–55% (wt) benzaldehyde or a mixture of 25–35% (wt) caprolactam and 75–65% (wt) phenol.

6. A thermally soluble copolymer composition according to claim 5, wherein said solvent is selected from the group consisting of (i) pyridine, N-methylpyrrolidinone, phenoxyethanol, or N-methylimidazole, and (ii) a mixture of 40–45% (wt) phenol and 60–55% (wt) benzaldehyde, or a mixture of 25–35% (wt) caprolactam and 75–65% (wt) phenol.

7. A thermally soluble copolymer composition according to claim 6, wherein said solvent is selected from the group consisting of (i) N-methylpyrrolidinone, phenoxyethanol, or N-methylimidazole, and (ii) a mixture of 40–45% (wt) phenol and 60–55% (wt) benzaldehyde, or a mixture of 25–35% (wt) caprolactam and 75–65% (wt) phenol.

8. A composition consisting of an ethylene/carbon monoxide copolymer, wherein said copolymer is present in an amount of from about 0.5% by weight of said composition, and a solvent, wherein said solvent is present in an effective solvent concentration of at least 20% by weight of said composition and said solvent is selected from the group consisting of (i) benzaldehyde, nitrobenzene, benzyl alcohol, anisole, cyclohexanone, cyclohexanol, γ-butyrolactone, N,N-dimethylacetamide, phenylhydrazine, caprolactam, pyridine, N-methylpyrrolidinone, phenoxyethanol, N-methylimidazole, or a mixture of two or more of these substances, and (ii) a mixture of 40–45% phenol and 60–55% benzaldehyde, or a mixture of 25–35% (wt) caprolactam and 75–65% (wt) phenol.

9. A thermally soluble copolymer composition which is a combination of an ethylene/carbon monoxide copolymer, and a solvent, wherein said copolymer is present in an amount of at least 0.5% by weight of said composition, said solvent is present in an effective solvent concentration of at least 20% by weight of said composition, and said solvent is benzoic acid or formic acid.

* * * * *